US012565588B2

(12) United States Patent
Niu et al.

(10) Patent No.: US 12,565,588 B2
(45) Date of Patent: Mar. 3, 2026

(54) COATING COMPOSITION AND WOOD ARTICLE MANUFACTURED THEREFROM

(71) Applicant: GUANGDONG HUARUN PAINTS CO., LTD, Foshan (CN)

(72) Inventors: Song Niu, Foshan (CN); Hongbin Chen, Foshan (CN); Shigang Fan, Foshan (CN); Xi Zhao, Foshan (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 824 days.

(21) Appl. No.: 17/608,187

(22) PCT Filed: Apr. 30, 2020

(86) PCT No.: PCT/CN2020/088163

§ 371 (c)(1),
(2) Date: Nov. 2, 2021

(87) PCT Pub. No.: WO2020/224523

PCT Pub. Date: Nov. 12, 2020

(65) Prior Publication Data

US 2022/0064455 A1 Mar. 3, 2022

(30) Foreign Application Priority Data

May 7, 2019 (CN) ........................ 201910377437.X

(51) Int. Cl.
*C09D 4/00* (2006.01)
*B05D 7/06* (2006.01)
(Continued)

(52) U.S. Cl.
CPC ................. *C09D 4/00* (2013.01); *B05D 7/06* (2013.01); *C08F 222/102* (2020.02);
(Continued)

(58) Field of Classification Search
None
See application file for complete search history.

(56) References Cited

U.S. PATENT DOCUMENTS 3,993,849 A 11/1976 Claus
4,408,018 A 10/1983 Bartman et al.
(Continued)

FOREIGN PATENT DOCUMENTS

CN 1757655 4/2006
CN 1757656 4/2006
(Continued)

OTHER PUBLICATIONS

Brinkhuis, et al. "Taming the Michael Addition Reaction" European Coatings Journal, May 2015, 7 pages.
(Continued)

*Primary Examiner* — Chinessa T. Golden
(74) *Attorney, Agent, or Firm* — Tucker Ellis LLP

(57) ABSTRACT

The present application relates to a coating composition and wood article manufactured therefrom, the coating composition comprising: (A) a film-forming resin composition comprising a reactive donor capable of providing two or more nucleophilic carbanions, and a reactive acceptor comprising two carbon-carbon double bonds; (B) a catalyst for catalyzing the Michael addition crosslinking reaction between the reactive donor and the reactive acceptor, wherein at least one of the reactive acceptor and the reactive donor comprises an aromatic ring structure, and wherein the polymer formed by homopolymerization of the reactive acceptor has a Tg of 100° C. or higher.

14 Claims, 2 Drawing Sheets

(51) Int. Cl.

| | |
|---|---|
| ***C08F 222/10*** | (2006.01) |
| ***C08G 59/16*** | (2006.01) |
| ***C08G 59/24*** | (2006.01) |
| ***C08K 5/3472*** | (2006.01) |

(52) U.S. Cl.

CPC ...... *C08F 222/103* (2020.02); *C08G 59/1455* (2013.01); *C08G 59/245* (2013.01); *C08K 5/3472* (2013.01); *B05D 2502/00* (2013.01); *C08G 2150/00* (2013.01)

(56) References Cited

U.S. PATENT DOCUMENTS

| | | | |
|---|---|---|---|
| 4,602,061 | A | 7/1986 | Akkerman |
| 4,766,177 | A | 8/1988 | Miller et al. |
| 4,871,822 | A | 10/1989 | Brindoepke et al. |
| 5,017,649 | A | 5/1991 | Clemens |
| 5,132,367 | A | 7/1992 | Chan |
| 5,459,178 | A | 10/1995 | Chan et al. |
| 5,567,761 | A | 10/1996 | Song |
| 6,348,530 | B1 | 2/2002 | Reck et al. |
| 7,041,749 | B2 | 5/2006 | Dammann et al. |
| 7,473,734 | B2 | 1/2009 | Beckley et al. |
| 7,799,943 | B2 | 9/2010 | Shah et al. |
| 7,951,869 | B2 | 5/2011 | Funston |
| 9,023,942 | B2 | 5/2015 | Van Der Zande-De Maertelaere et al. |
| 9,284,423 | B2 | 3/2016 | Brinkhuis et al. |
| 9,328,187 | B2 | 5/2016 | Mestach et al. |
| 9,534,081 | B2 | 1/2017 | Brinkhuis et al. |
| 9,587,138 | B2 | 3/2017 | Brinkhuis et al. |
| 2003/0083436 | A1* | 5/2003 | Deitch .................... C09J 201/06 525/176 |
| 2005/0081994 | A1 | 4/2005 | Beckley et al. |
| 2005/0245636 | A1* | 11/2005 | Fechter ................. C08F 290/06 522/178 |
| 2005/0245721 | A1* | 11/2005 | Beckley ................. C09J 201/02 528/271 |
| 2013/0296485 | A1* | 11/2013 | Hsueh .................... C08G 63/66 524/592 |
| 2014/0221542 | A1* | 8/2014 | Brinkhuis ............ B01J 31/0205 528/308 |
| 2018/0000720 | A1 | 1/2018 | Ijdo et al. |
| 2018/0163084 | A1* | 6/2018 | Gessner ...................... C08J 3/24 |
| 2018/0265735 | A1* | 9/2018 | Xu ........................... C09D 5/34 |
| 2018/0353400 | A1 | 12/2018 | Ijdo et al. |

FOREIGN PATENT DOCUMENTS

| | | | |
|---|---|---|---|
| CN | 1891724 | | 1/2007 |
| CN | 102834437 | | 12/2012 |
| CN | 105324426 | | 2/2016 |
| CN | 105339448 | | 2/2016 |
| CN | 107660227 | | 2/2018 |
| CN | 107660228 | | 2/2018 |
| CN | 110240821 | | 9/2019 |
| EP | 0156210 | | 10/1985 |
| EP | 0227454 | | 7/1987 |
| EP | 0199087 | | 1/1989 |
| EP | 0326723 | | 3/1993 |
| EP | 1593728 | A2 | 11/2005 |
| EP | 1813630 | | 8/2007 |
| WO | 2005121595 | | 12/2005 |
| WO | 2006024669 | | 3/2006 |
| WO | 2006065369 | | 6/2006 |
| WO | 2008080908 | | 7/2008 |
| WO | 2010040844 | | 4/2010 |
| WO | 2011121085 | | 10/2011 |
| WO | 2011124663 | | 10/2011 |
| WO | 2012130817 | | 10/2012 |
| WO | 2012136714 | | 10/2012 |
| WO | 2012140042 | | 10/2012 |
| WO | 2013050574 | | 4/2013 |
| WO | 2013050622 | | 4/2013 |
| WO | 2014166880 | | 10/2014 |
| WO | 2016166369 | | 10/2016 |
| WO | 2016166381 | | 10/2016 |
| WO | 2019217384 | A1 | 11/2019 |

OTHER PUBLICATIONS

Sheng et al. "Catalysis by supported Lewis acids: An efficient method for transesterification of phosphotriesters" Elsevier B.V. 2009, 4 pages.

Krause, et al. "Recent Advances in Catalytic Enantioselective Michael Additions" Synthesis 2001, No. 2, 171-196, 26 pages.

International Search Report & Written Opinion for patent appl. No. PCT/CN2020/088163, dated Jul. 15, 2020 (21 pages, including English translation).

Office Action for Chinese patent application No. 201910377437.X, dated Nov. 18, 2020 (21 pages, including English translation of Office Action).

Peixi, Wang, "Preparation of Radiation Curable Printing Inks from Multifunctional Acrylate Oligomers", China Adhesives, Issue 7, Jul. 31, 2008, p. 27 (including English translation of Abstract).

Notice of Allowance for Chinese patent application No. 201910377437.X, dated Jan. 6, 2021 (5 pages, including English translation of Notice of Allowance).

Supplementary European Search Report for EP Application No. EP 20 80 1548 issued Dec. 21, 2022.

* cited by examiner

COATING COMPOSITION AND WOOD ARTICLE MANUFACTURED THEREFROM

CROSS REFERENCE TO RELATED APPLICATION

This application is the National Stage filing under 35 U.S.C. 371 of International Application No. PCT/CN2020/088163 filed on Apr. 30, 2020, which itself claims to Chinese Patent Application No. 201910377437.X, entitled with "COATING COMPOSITION FOR WOOD SUBSTRATE AND WOOD ARTICLE MANUFACTURED THEREFROM" and filed on May 7, 2019, which is incorporated herein by reference in their entireties.

TECHNICAL FIELD

The present application relates to a coating composition for wood substrate and wood article manufactured therefrom. More specifically, the present application relates to a coating composition for wood substrate which is cured by a Michael addition reaction and a wood product made therefrom.

BACKGROUND

Traditional solvent-based two-component polyurethane has been widely used in wood coatings due to its excellent overall properties, including drying speed, fullness, film hardness, gloss, and chemical resistance. At present, it is still the preferred paint for wood. Nevertheless, due to increasingly strict environmental regulations, the standards for free diisocyanates (such as TDI) and volatile organic compound (VOC) emission in coating applications have become more and more stringent as free TDI is extremely harmful to human body and environment protection. Therefore the technology on non-isocyanate (NICN) curing without any free TDI has gained great attention in academic and industrial fields.

Up to date, there have being several potentially curable methods by NICN in wood coatings, for example including a polycarbodiimide (PCDI) curing system, a Michael Addition curing system and so on. The PCDI curing system, however, is hardly commercialized on account of its short pot-life at this stage. The Michael Addition curing system has been widely applied in industry fields as a result of its long pot-life, which has been commercially promoted for a certain period by the commercial company Allnex, called "Acure". What is particularly attractive is that this Michael Addition curing system has many attractive advantages, including: (1) capable of curing at ambient temperatures, even lower temperature; (2) very low solvent content such as VOC<250 g/l; (3) very long pot-life such as a pot life of >8 hours at 23° C.; (4) excellent appearance such as gloss @ 60° of >90 and DOI>90; (5) capable of applying at a thick layer, such as with as a thickness of >150 μm; (6) very good chemical resistance; (7) excellent flexibility; (8) good outdoor durability; (9) free of isocyanate; formaldehyde and organotin. Thus, there has been a strong demand for this Michael Addition curing system in market. Nevertheless, the application of this system on wood substrates is not satisfactory. The hardness of the dry coating film cured at room temperature using this Acure curing technology is far lower than that of the traditional two-component polyurethane coating, and cannot meet the application requirements.

At present, it is urgent in wood coating industry to provide a Michael addition curing coating system that can achieve desired film hardness to replace the traditional two-component polyurethane system.

SUMMARY

In one aspect, the present application discloses a coating composition for wood substrate comprising:

(A) a film-forming resin composition comprising a reactive donor capable of providing two or more nucleophilic carbanions, and a reactive acceptor comprising two carbon-carbon double bonds; and (B) a catalyst for catalyzing the Michael addition crosslinking reaction between the reactive donor and the reactive acceptor, wherein at least one of the reactive acceptor and the reactive donor comprises an aromatic ring structure, and wherein the polymer formed by homopolymerization of the reactive acceptor has a Tg of 100° C. or higher, such as Measured by differential scanning calorimetry.

In some embodiments of the present application, the reactive acceptor may be one or more selected from the group consisting of α,β-unsaturated carboxylic acid esters of the formula:

(Formula A)

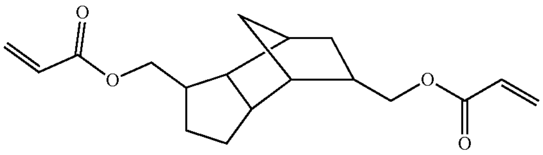

;

(Formula B)

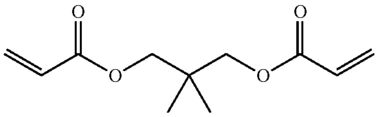

; and (Formula C)

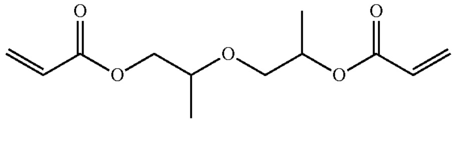

.

In another aspect, the present application provides a wood article comprising a wood substrate having at least one major surface; and a cured coating formed from the coating composition of the present application that is directly or indirectly applied on the major surface.

In the present application, the applicant has creatively put forward to such a design that at least one of the reactive acceptor or donor in the Michael addition curing system comprises an aromatic ring structure, and a difunctional reactive acceptor i.e. containing two carbon-carbon double bonds having a Tg of 100° C. or higher is used, so that the cured coating obtained in this way can obtain a coating hardness comparable to that of a traditional two-component polyurethane coating.

The inventors of the present application surprisingly discovered that the introduction of an aromatic ring structure in at least one of the reactive acceptor or the reactive donor can significantly increase hardness of the cured coating formed therefrom. The inventors of the present application further surprisingly found that a cured coating formed by using a bi-functional reactive acceptor with a Tg greater than 100° C. has a significantly higher hardness than a cure coating formed by using other trifunctional and tetrafunctional reactive acceptor, which has never been recognized before the present application.

The details of one or more embodiments of the invention are set forth in the description below. Other features, objects, and advantages of the invention will be apparent from the description, and from the claims Definition As used herein, "a", "an", "the", "at least one", and "one or more" are used interchangeably. Thus, for example, a coating composition that comprises "an" additive can be interpreted to mean that the coating composition includes "one or more" additives.

Throughout the present application, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this invention, as along as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "Michael Addition" refers to the nucleophilic addition of a carbanion of a reactive donor to a carbon-carbon double bond of a reactive acceptor. A Michael Addition reaction follows the general reaction schematic shown here:

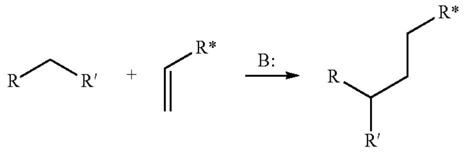

In the reaction schematic shown above, B: is a catalyst, which reacts with the Michael addition reactive donor through deprotonation to form a carbanion for subsequent addition reaction with the Michael addition reactive acceptor.

As used herein, the term "carbon-carbon double bond group" refers to a structure containing a carbon-carbon double bond in its molecule, excluding a benzene ring. Examples of carbon-carbon double bond groups include, but are not limited to, —C═C—C═C—, —C═C—C≡C—, —C═C—CHO, —C═C—CO—, —C═C—C(O)O—, and —C═C—CN.

As used herein, the term "nucleophilic carbanion", refers to an active intermediate of carbon with a lone pair of electrons to which two or three strong electronegative groups are attached. The strong electronegative groups may include, but not limited to, $—NO_2$, —C(═O)—, $—CO_2R_1$, $—SO_2—$, —CHO, —CN, and $—CONR_2$, and the like, wherein $R_1$ and $R_2$ each independently represent an alkyl group. In some embodiments of the present application, the nucleophilic carbanion is derived from an acidic proton C—H in activated methylene or methine group.

As used herein, the term "aromatic ring structure" refers to a rigid closed aromatic ring or ring system, which is different from flexible alkyl or cycloalkyls, such as cyclohexyl. Examples of the aromatic ring structure include, but are not limited to, phenylene, naphthylene, biphenylene, fluorenylene, and indenyl, and heteroarylene (such as closed aromatic or aromatic cyclic hydrocarbon or ring system in which one or more atoms in the ring are elements other than carbon (such as nitrogen, oxygen, sulfur, etc.).

The term "glass transition temperature (Tg)" in the context of "reactive acceptor" refers to the glass transition temperature of homopolymer formed by homopolymerization of the reactive acceptor, which is, for example, measured with Differential Scanning calorimetry.

The term "glass transition temperature (Tg)" in the context of "reactive donor" refers to the glass transition temperature of the reactive donor itself, which is measured by Differential Scanning calorimetry, for example.

The term "Epoxy Equivalent Weight" (EEW) in the context of "reactive donor", refers to the mass of the reactive donor containing 1 mol of epoxy group. In the case where the reactive donor is an acetoacetate functional epoxy, the epoxy equivalent weight refers to the mass of the acetoacetate functional epoxy containing 1 mol of epoxy groups. Generally, the lower the epoxy equivalent weight, the more epoxy groups contained in the reactive donor are, and the higher the reactivity is.

The term "main surface", when used in the context of a substrate, refers to a surface formed by lengthwise and widthwise dimensions of the substrate for providing decoration.

The term "on", when used in the context of a coating composition applied on a main surface of substrate, includes the coating composition applied directly or indirectly to the main surface of substrate. In some embodiments of the present application, the coating composition according to the present application is applied directly to a main surface of wood substrate without any adhesion issue. In some embodiments of the present application, there be one or more adhesion promoting layers between the coating composition according to the invention and wood substrate to provide desired adhesion.

The term "volatile organic compound" ("VOC") refers to any compound of carbon, excluding carbon monoxide, carbon dioxide, carbonic acid, metallic carbides, or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the composition or coating composition, and is reported, for example, as kilogram (kg) of VOC per liter.

The term "comprises", "comprising", "contains" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

Figure 1:
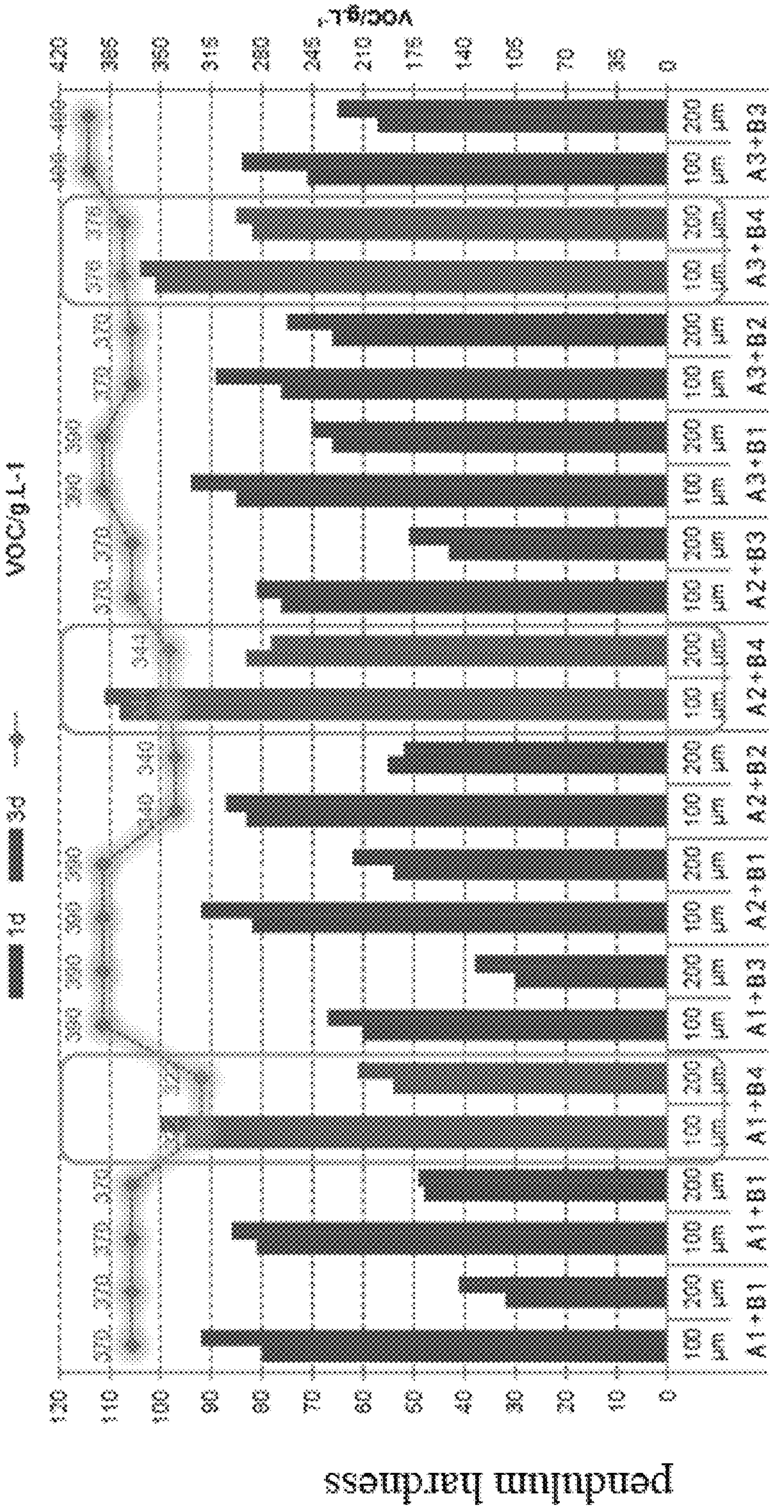
FIG. 1 shows the hardness and VOC results of cured coatings formed by various Michael addition curing varnishes, where the coating thickness is 100 micrometers or 200 micrometers. The varnish includes coating compositions formed by three reactive donors (A1, A2 and A3) with different epoxy equivalent weights and a bi-functional reactive acceptor (B4) with a Tg of 180° C., and coating compositions formulated by the above three reactive donors and tri-functional or tetra-functional reactive acceptors (B1, B2, and B3) with Tg of 62° C., 98° C., and 103° C., respectively.

The present application in one aspect provides a coating composition for wood substrate comprising: (A) a film-forming resin composition comprising a reactive donor capable of providing two or more nucleophilic carbanions, and a reactive acceptor comprising two carbon-carbon double bonds; (B) a catalyst for catalyzing the Michael addition crosslinking reaction between the reactive donor and the reactive acceptor, wherein at least one of the reactive acceptor and the reactive donor comprises an aromatic ring structure, and wherein the polymer formed by homopolymerization of the reactive acceptor has a Tg of 100° C. or higher.

Film-Forming Resin Composition

The term "film-forming resin composition" herein refers to a resin composition that constitutes main body of the coating formed by the coating composition for wood substrate of the present application, which may include a reactive donor capable of providing two or more nucleophilic carbanions, a reactive acceptor comprising two carbon-carbon double bonds, solvents, and optional additional additives.

According to the present application, at least one of the reactive acceptor and the reactive donor includes an aromatic ring structure. As described above, the aromatic ring structure has a rigid structure, which is different from flexible alkyl or cycloalkyls such as cyclohexyl. The inventors of the present application surprisingly found that the Michael addition cured coatings containing the above aromatic ring structure showed improvement of coating hardness compared to the Michael addition cured coatings with flexible alkyl or cycloalkyl groups (for example Acure cured coatings from Allnex). In some embodiments of the present application, the reactive acceptor comprises an aromatic ring structure. In other embodiments of the present application, the reactive donor comprises an aromatic ring structure. In still other embodiments of the present application, both the reactive acceptor and the reactive donor comprise an aromatic ring structure.

According to the present application, the film-forming resin composition comprises a reactive acceptor containing two carbon-carbon double bond groups. Generally speaking, during the curing and cross-linking process of a coating, the higher the functionality of the reactant, the higher the cross-linking density of the cured coating is, and the higher the hardness of the coating is. However, the inventors of the present application surprisingly found that, compared to reactive acceptors containing more than two carbon-carbon double bond groups, for example, reactive acceptors containing three or four carbon-carbon double bond groups, reactive acceptors containing two carbon-carbon double bond groups is more beneficial to increase the hardness of the cured coating in the Michael addition curing system. Therefore, reactive acceptors containing more than two carbon-carbon double bond groups are not included in the scope of the present application.

According to the present application, the glass transition temperature of the reactive acceptor is also an important parameter that affects hardness of the cured coating. In some embodiments of the present application, the reactive acceptor has a glass transition temperature of 100° C. or higher, preferably a glass transition temperature of 101° C. or higher, and more preferably a glass transition temperature of 102° C. or higher, still more preferably a glass transition temperature of 103° C. or higher, but the glass transition temperature of the reactive acceptor should not be too high. If the glass transition temperature of the reactive acceptor is too high, it may adversely affect crosslinking degree of Michael addition curing, thereby affecting hardness of the resulting cured coating. Generally, the glass transition temperature of the reactive acceptor does not exceed 200° C., preferably does not exceed 195° C., and more preferably does not exceed 190° C. In a specific embodiment of the present application, the glass transition temperature of the reactive acceptor is in the range of 100-190° C., preferably in the range of 104-180° C.

According to an embodiment of the present application, the reactive acceptor has a relatively low molecular weight and usually exists in a non-polymer form. Preferably, the reactive acceptor has a molar mass of 1000 g/mol or lower, preferably a molar mass of 500 g/mol or lower, and more preferably a molar mass of 350 g/mol or lower.

According to an embodiment of the present application, the carbon-carbon double bond group contained in the reactive acceptor usually has a structure represented by the following formula I:

$$C{=}C{-}CX \quad \text{(Formula I)}$$

in which, CX represents any one of alkenyl group, alkynyl group, aldehyde group (—CHO), ketone group (—CO—), ester group (—C(O)O—) and cyano group (—CN). Preferably, the carbon-carbon double bond group is derived from one or more of α, β-unsaturated aldehyde, α, β-unsaturated ketone, α, β-unsaturated carboxylate ester and α, β-unsaturated nitrile, preferably from α, β-unsaturated carboxylate esters.

In one embodiment of the present application, the reactive acceptor may be selected from one or more of α, β-unsaturated carboxylate esters represented by the following formula:

(Formula A)

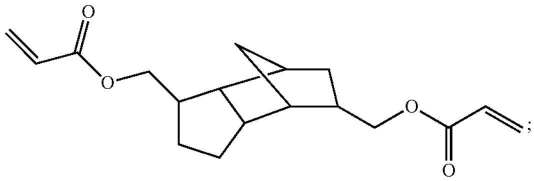

;

(Formula B)

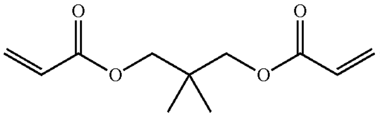

;

(Formula C)

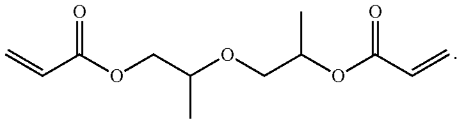

.

According to the present application, the film-forming resin composition comprises a reactive donor capable of providing two or more nucleophilic carbanions. As described above, the nucleophilic carbanion refers to an active intermediate of carbon with a lone pair of electrons to which two or three strong electronegative groups are typically attached. As an example of the strong electronegative groups, it may be selected from one or more of the following $-NO_2$, $-C(=O)-$, $-CO_2R_1$, $-SO_2-$, $-CHO$, $-CN$, and $-CONR_2$, and the like, wherein $R_1$ and $R_2$ each independently represent an alkyl group.

According to an embodiment of the present application, the nucleophilic carbanion of reactive donor is derived from an acidic proton C—H in activated methylene or methine group. Suitable examples capable of providing above acidic proton C—H comprise, without limitation, dialkyl malonates (e.g., dimethyl malonate, diethyl malonate, and the like), cyanoacetates (e.g., methyl cyanoacetate, ethyl cyanoacetate, and the like), acetoacetates, propionyl acetates, acetylacetone, dipropionyl methane and the like, and mixture or combination thereof.

According to some embodiments of the present application, the reactive donor may be obtained by reacting an acetoacetate or malonate compound with an aromatic compound. Preferably, the aromatic compound is an aromatic epoxy resin and/or an aromatic polyester. The inventors of the present application surprisingly discovered that the reactive donor containing an aromatic ring structure can provide a cured coating with improved hardness.

In an embodiments of the present application where the reactive donor has an aromatic epoxy backbone, the aromatic epoxy backbone is derived from bisphenol A, bisphenol F, novolac epoxy resin, its mixture and its combination. Suitable aromatic epoxy resins that can be functionalized to act as a reactive donor include, but are not limited to, bisphenol A epoxy resin, bisphenol F epoxy resin, and novolac epoxy resin. The epoxy resin can be functionalized by, for example, reacting with diketene, transesterifying with an alkyl acetoacetate or dialkyl malonate, esterification with malonic acid or a monoester or acid functional malonate polyester and the like. In a preferred embodiment, the reactive donor is obtained by transesterification of epoxy resin with an alkyl acetoacetate or dialkyl malonate, wherein the malonate or acetoacetate functional group is present in the main chain, as a pendent chain, or present as both, preferably present as a pendent chain.

In an embodiment of the present application where the reactive donor has an aromatic polyester backbone, the aromatic polyester backbone is derived from a dicarboxylic acid component comprising phthalic acid and its anhydride, terephthalic acid and its anhydride, isophthalic acid and its anhydride, or any combination thereof. As an example, a suitable aromatic polyester resin that can be functionalized to act as a reactive donor can be obtained by esterifying an acid component containing an aromatic di- or polycarboxylic acid or anhydride thereof with one or more di- or polyhydric alcohols. Examples of the aromatic di- or polycarboxylic acid preferably includes, without limitation, phthalic acid and its anhydride, terephthalic acid and its anhydride, isophthalic acid and its anhydride, trimellitic anhydride or any combination thereof. Preferred examples of the di- or polyhydric alcohol include, without limitation, trimethylolpropane, pentaerythritol, neopentyl glycol, diethylene glycol, 1,4-butanediol, ethylhexylpropanediol, 2,4-diethyl-1,5-pentanediol, ditrimethylolpropane, dipentaerythritol or any combination thereof. The polyester resin can be functionalized by, for example, reacting with diketene, transesterifying with an alkyl acetoacetate or dialkyl malonate, esterification with malonic acid or a monoester or acid functional malonate polyester and the like. In a preferred embodiment, the reactive donor is obtained by transesterification of polyester resin with an alkyl acetoacetate or dialkyl malonate, wherein the malonate or acetoacetate functional group is present in the main chain, as a pendent chain, or present as both, preferably present as a pendent chain.

According to an embodiment of the present application, the reactive donor has a relatively high glass transition temperature. It was found by the inventors of the present application that increasing the glass transition temperature of the reactive donor is beneficial to increase the hardness of the cured coating. In one embodiment of the present application, the reactive donor has a glass transition temperature of 25° C. or higher. However, considering the practical application, the glass transition temperature of the reactive donor should not be too high, otherwise it will negatively affect curing effect. Therefore, the reactive donor according to the present application preferably has a glass transition temperature in the range of 25° C. to 40° C.

According to an embodiment of the present application, in the case where the reactive donor is derived from an aromatic epoxy resin, the epoxy equivalent weight of the reactive donor is preferably set in a specific range. The inventors of the present application surprisingly discovered that the epoxy equivalent weight of the reactive donor is directly related to the VOC of the coating composition, which was not realized prior to the present application. Without being bound by any theory, the inventors speculate that the reason may be that the epoxy equivalent weight is related to viscosity of epoxy resin, and a higher epoxy equivalent weight corresponds to a higher resin viscosity. Therefore, an epoxy resin with a lower epoxy equivalent weight can form a film with the aids of a smaller amount of solvent well, and thus less VOC is emitted. According to an embodiment of the present application, the epoxy equivalent weight of the reactive donor is in the range of 400-2300 g/mol, preferably in the range of 470-1200 g/mol, more preferably in the range of 500-900 g/mol.

In an embodiment of the present application, the reactive donor and the reactive acceptor are mixed together to form part of the film-forming resin composition. Preferably, based on the total weight of the film-forming resin composition, the reactive donor is present in an amount of 50-75% by weight, and the reactive acceptor is present in an amount of 15-30% by weight.

In an embodiment of the present application, in addition to the reactive donors and reactive acceptors described herein, the film-forming resin composition also comprises resins that do not participate in the Michael addition reaction, including but not limited to polyester resins, acrylic resin, epoxy resin, polyurethane resin, and the like.

In an embodiment of the present application, the film-forming resin composition may further comprise one or more solvents. Suitable solvents may be aqueous solvents, organic solvents or mixtures thereof. Examples of suitable organic solvents include, but are not limited to, aliphatic solvents; aromatic and/or alkylated aromatic solvents such as toluene, xylene, and the like; alcohols such as isopropanol, n-butanol; esters such as methoxypropyl acetate, ethyl acetate, butyl acetate, isobutyl acetate and the like; ketones such as methyl ethyl ketone, methyl n-amyl ketone, and the like; glycol ethers; glycol ether esters; and their mixture or combination.

In an embodiment of the present application, the film-forming resin composition of the present application may optionally further comprise other additional additives commonly used in the coating composition, which additives do not adversely affect the coating composition or cured product obtained therefrom. Suitable additives comprise, for example, those that improve processing or manufacturing properties of the composition, enhance aesthetics of the composition or cured product obtained therefrom, or improve specific functional properties or characteristics of the composition or cured product obtained therefrom (such as adhesion to the substrate). The additives that may be included are, for example, selected from adhesion promoters, curing accelerators, open time regulators, pigments and fillers, surfactants, lubricants, defoamers, dispersants, UV absorbers, colorants, coalescing agents, thixotropic agents, antioxidants, stabilizers, preservatives, and fungicides for providing the required performance as needed. The content of each optional ingredient is preferably sufficient to achieve its intended purpose, but does not adversely affect the composition or cured product obtained therefrom.

Coating Composition

In addition to the above film-forming resin composition, the coating composition according to the present application also comprises a catalyst for catalyzing the Michael Addition crosslinking reaction of the reactive acceptor and reactive donor.

In some embodiments of the present application, the catalyst is a latent base catalyst.

In an embodiment of the present application, the latent base catalyst described herein is a substituted carbonate salt having the structure of formula (II):

(I)

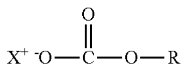

In Formula (II):

- $X^+$ is a non-acidic cation. Suitable examples include, without limitation, alkali metal ion, alkali-earth metal ion, ammonium ion, phosphonium ion, and the like. Preferably, $X^+$ is a lithium, sodium, or potassium ion, and the like. More preferably,
- $X^+$ is a quaternary ammonium ion or a phosphonium ion;
- R is H, optionally substituted C1-C10 alkyl, C6-C12 aryl, C7-C14 aralkyl or combinations thereof. Preferably, R is an unsubstituted alkyl group having 1 to 4 carbon atoms. If the R group is substituted, the substituents are selected so as to not substantially interfere with the crosslinking reaction. In order to avoid interference with the action of the base catalyst, acidic substituents, such as for example, carboxylic acid substituents are present in only insubstantial amounts, or absent altogether.

In an embodiment, the latent base catalyst described herein is a compound with the general structure shown in Formula (II), wherein the cation $X^+$ is linked with the carbonate group of Formula (II) in a single molecule, i.e. the latent base catalyst has the general structure shown in Formula (II-1):

(Formula II-1)

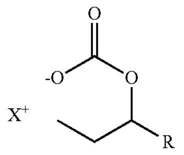

in the formula (II-1), R and $X^+$ are defined as above.

In another embodiment, the latent base catalyst described herein is a compound of the general structure shown in Formula (II), wherein the group R is a polymer, and/or the cation $X^+$ is a quaternary ammonium ion or a phosphonium ion.

In a preferred embodiment, the latent base catalyst described herein is preferably a quaternary alkyl ammonium carbonate. Suitable examples include, without limitation, tetrahexylammonium methyl carbonate, tetradecyl-trihexylammonium-methyl carbonate, tetradecylammonium methyl carbonate, tetrabutylammonium methylcarbonate, tetrabutylammonium ethylcarbonate, benzyltrimethylammonium methyl carbonate, or trihexylmethylammonium methyl carbonate or trioctylmethylammonium methyl carbonate, and mixtures or combinations thereof. Preferably, the latent base catalyst described herein include tetrabutylammonium alkylcarbonate In an embodiment, the amount of latent base catalyst used herein may vary depending on the properties of the coating composition. Preferably, the composition includes about 0.001 to 1 meq catalyst per gram of resin solids, more preferably 0.02 to 0.07 meq per gram of resin solids. Latent catalysts of this type are known in the art. For example, a commercially available version of the latent catalyst described herein is called A-CURE 500 (Allnex, Frankfurt, Germany).

Without limiting to theory, it is believed that the latent base catalyst of Formula (II) functions by releasing carbon dioxide when the carbonate salt decomposes. This produces a strong base, i.e. a hydroxide, an alkoxy, or an aralkyloxy base. In a closed pot, this reaction takes place slowly, allowing for extended pot life. When the coating is applied and surface area increases, the base is regenerated quickly as carbon dioxide escapes from the surface, allowing for faster cure (i.e. drying and hardness development) of the coating. Accordingly, the use of a latent base catalyst of Formula (II) allows for optimal potlife, open time, and cure performance for the crosslinkable coating compositions described herein.

In another embodiment, the catalyst may also include conventional catalysts (i.e., non-latent catalysts) known to those skilled in the art that are different from the above-mentioned latent base catalysts, which may be used alone or in combination with the latent base catalyst described herein to accelerate the Michael addition reaction.

Examples of suitable non-latent catalysts include, without limitation, tetrabutyl ammonium hydroxide (TBAH), ammonium hydroxide, DBU (8-Diazabicyclo[5.4.0]undec-7-ene), DBN (1,5-Diazabicyclo[4.3,0]non-5-ene), and TMG (1,1,3,3-tetramethylguanidine).

Suitable additional examples of non-latent catalysts include, without limitation, salts of cations including non-acidic cations such as K+, Na+, Li+, or weakly acidic cations such as, for example, protonated species of strong organic bases such as, for example, DBU, DBN, or TMG and the like, paired with a basic anion $X^-$ from an acidic X—H group-containing compound, where $X^-$ comprises N, P, O, S or C and the anion $X^-$ is a reactive donor capable of reaction with the reactive acceptor (e.g. acrylate). Suitable examples of such salts include, without limitation, salts formed from the reaction of KOH and benzotriazole, TBAH and benzotriazole, or KOH and 1,2,4-triazole, included at a level between 0.001 and 1 meq/gram solid resin. Mixtures or combinations of the above may be used. The preferred non-latent catalyst is a solution of potassium benzotriazolide formed from the reaction of KOH and benzotriazole at an equal molar ratio in ethanol.

Preferably, according to the present application, the weight ratio of the catalyst to the film-forming resin composition can be varied in the range of 2:100 to 8:100. Generally speaking, when the weight ratio of the catalyst to the film-forming resin composition is less than 2:100, the curing performance of the resulting coating is poor. Generally speaking, when the weight ratio of the catalyst to the film-forming resin composition is greater than 8:100, the operation performance of the resulting Michael addition-cured coating and/or the mechanical properties of the resulting coating may decrease. According to actual needs, an additional inert diluent that will not affect reactivity of the above catalyst and film-forming resin composition can be added during the preparation of the catalyst and/or film-forming resin composition, so as to reduce the viscosity of each component, for example. Therefore, the weight ratio of the catalyst to the film-forming resin composition is not limited to the above range, and can be adjusted according to actual needs.

According to the present application, the two-component curable coating composition can be prepared by simply mixing the film-forming resin composition and the catalyst in a mixing device at a predetermined weight ratio before application. The mixed curable coating composition can be can be applied in a variety of ways that are familiar to those skilled in the art, including spraying (e.g., air assisted, airless or electrostatic spraying), brushing, rolling, flooding and dipping. In an embodiment of the present application, the mixed curable coating composition is coated by spraying. The curable coating composition can be applied in various wet film thickness. In an embodiment of the present application, the coating composition is applied in such a wet film thickness in the range of about 100 to about 400 μm, preferably in the range of about 100 to 200 μm. The applied coating may be cured by air drying at room temperature or by accelerating drying with various drying devices e.g., ovens that are familiar to those skilled in the art.

In some embodiments of the present application, the coating composition has a VOC content of 420 g/L or lower.

In some embodiments of the present application, the coating composition is applied at a wet coating thickness of 100 microns and dried for one day, and the resulting cured coating exhibits a pendulum hardness of 70 or greater, preferably exhibits a pendulum hardness of 80 or more, and more preferably exhibits a pendulum hardness of about 90 or more.

In some embodiments of the present application, the coating composition is applied at a wet coating thickness of 200 microns and dried for one day, and the resulting cured coating exhibits a pendulum hardness of 50 or greater, preferably exhibits a pendulum hardness of 60 or more, and more preferably exhibits a pendulum hardness of about 70 or more.

The "pendulum hardness" in the present application is obtained according to the ASTM D-4366 test, recorded in counts.

Wood Article

Another aspect of the present application provides a wood article, which comprises: a wood substrate having at least one major surface; and a cured coating formed from the coating composition according to the present application that is directly or indirectly applied on the major surface.

As the wood substrate used to manufacture the wood article of the present application, any suitable wood substrate known in the art can be used. In the present application, the term "wood substrate" refers to any cellulose/lignin material derived from the hard, fibrous structural organization of the stems and roots of trees or other woody plants. Wood includes, for example, hardwood and softwood wood cut directly from trees, and engineered wood composite materials made of wood strips, wood chips, wood fibers, or wood veneers. Examples of wood composite materials include, but are not limited to, plywood, oriented strand board (OSB), medium density fiberboard (MDF), particle board, and the like.

The wood article of the present application comprises a wood substrate containing an acidic substance. As an example, the acidic substance includes tannins, aldehydes and/or hemiacetals. In some embodiments of the present application, the wood substrate has a tannin content of at least 0.1% by weight, preferably a tannin content of at least 1% by weight, more preferably a tannin content of at least 5% by weight, and even more preferably a tannin content of at least 10% by weight, even more preferably a tannin content of 30% by weight, as determined by CNS4716-2005. As exemplary wood substrates, one or more of hardwood, chestnut, eucalyptus, red chestnut, camellia, eucalyptus, Douglas fir, Japanese cedar, American cypress, Japanese red pine, Japanese cypress, water walnut, black walnut, maple, Japan beech, Japanese paulownia, birch, Borneo, magnolia, ash, teak, *Xylosma japonicum*, Catalpa wood, *Dryobalanops* spp., fir, oak and rubber wood may be used.

According to the invention, the wood substrate has at least one, preferably two, major surfaces that are opposite one another. As used herein, "major surface" is a surface defined by the lengthwise and widthwise dimensions of the wood substrate for providing decoration. Preferably, the major surface of wood substrate may contain polar groups such as hydroxyl groups, amino groups, mercapto groups, and the like so that when the composition containing a functionalized silane of the present application is applied thereon, the alkoxy or hydroxyl group attached to the silicon atom of the functionalized silane can undergo a bonding reaction with a hydroxyl group on the surface of the wood substrate, thereby forming an adhesion promotion layer. The hydroxyl group on the surface of wood substrate may be originated from cellulose of the wood substrate or may be introduced on the surface of wood substrate by performing corona treatment on the major surface of substrate, for example.

According to the present application, the wood article can be prepared, for example, by the following steps: (1) providing a polished wood substrate; (2) using a coating and curing process to sequentially coat the wood substrate and form one or more of the Michael Addition curable coating of the present application. Optionally, a colorant can be applied on the wood substrate prior to step (2), so as to provide the wood substrate with the desired color.

According to the present application, the wood articles thus obtained can be used in the following applications, including, but not limited to: household furniture, such as tables, chairs, cabinets, and the like; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

The following examples describe the present application in more detail, which are for illustrative purposes only, since various modifications and changes will be apparent to those skilled in the art from the scope of the present application. Unless otherwise indicated, all parts, percentages, and ratios reported in the following examples are on a weight basis and all reagents used in the examples are commercially available and may be used without further treatment.

EXAMPLES

Reactive Donor

Synthesis Example 1: Acetoacetate Epoxy Resin (A1)

At room temperature, a four-necked flask equipped with a thermometer, a top stirrer, a gas inlet and a distillation device was charged with 220.30 g of epoxy resin (NanYa, EEW: 471 g/mol) and 79.70 g of tert-butyl acetoacetate (t-BAA). $N_2$ gas was supplied through the gas inlet for providing $N_2$ protection. Then, the resulting reaction mixture was slowly heated to about 130° C., collected distillate (tert-butanol) and maintained at this temperature until the distillation temperature did not exceed 78° C. Under this distillation temperature <=78° C., the temperature of mixture was raised to 160° C. When the temperature of mixture reached 160° C., it was kept for a while until the distillation temperature was below 60° C. The mixture was then cooled to below 100° C. and then mixed with n-butyl acetate (n-BA). The solids content is about 70%.

Synthesis Example 2: Acetoacetate Epoxy Resin (A2)

The detailed synthesis process was the same as Synthesis Example 1 (A1) with the exception that the amount of epoxy resin (NanYa, EEW: 622 g/mol), t-BAA and n-BA were 212.54 g, 87.46 g and 101.02 g. The solid content is about 70%.

Synthesis Example 3: Acetoacetate Epoxy Resin (A3)

The detailed synthesis process was the same as Synthesis Example 1 (A1) with the exception that the amount of epoxy resin (NanYa, EEW: 722 g/mol), t-BAA and n-BA were 209.36 g, 90.64 g and 102.96 g. The solid content is about 70%.

The resin obtained in the above Synthesis Example 1-3 was used as a reactive donor and characterized. The characterization results are summarized in Table 1 below.

TABLE 1

Properties of various reactive donors

| Reactive donors | EEW/ $g \cdot mol^{-1}$ | $n_{avg}$ | Mn | Mw | PDI | Tg/° C. |
|---|---|---|---|---|---|---|
| A1 | 560 | 2.1 | 1650 | 3842 | 2.3 | 27 |
| A2 | 756 | 3.2 | 2369 | 5453 | 2.3 | 30 |
| A3 | 885 | 3.9 | 2845 | 6254 | 2.2 | 36 |

Reactive Acceptor

Table 2 below listed the structural formulas of commercially available reactive acceptor B1-B7 and their respective Tg.

TABLE 2 various reactive acceptors and their glass translation temperatures

| Reactive Acceptors | Structure Formulas | Tg/° C. |
|---|---|---|
| B1 | 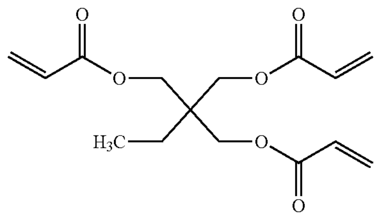 [SMILES: C=CC(=O)OCC(CC)(COC(=O)C=C)COC(=O)C=C] | 62 |

TABLE 2-continued various reactive acceptors and their glass translation temperatures

| Reactive Acceptors | Structure Formulas | Tg/° C. |
| --- | --- | --- |
| B2 | 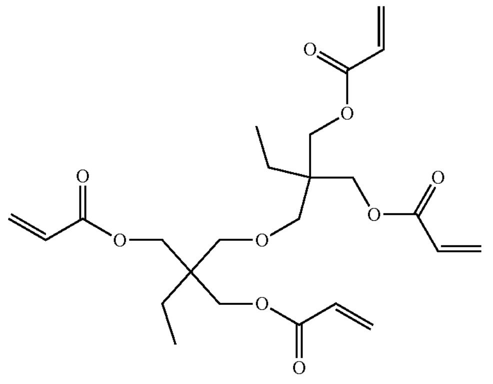 [SMILES: C=CC(=O)OCC(CC)(COCC(CC)(COC(=O)C=C)COC(=O)C=C)COC(=O)C=C] | 98 |
| B3 | 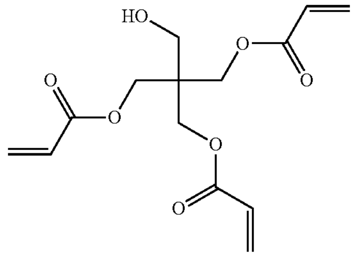 [SMILES: C=CC(=O)OCC(CO)(COC(=O)C=C)COC(=O)C=C] | 103 |
| B4 | 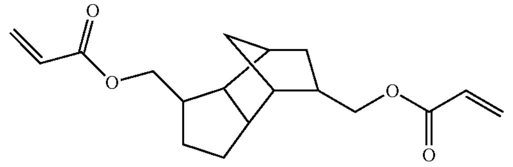 [SMILES: C=CC(=O)OCC1CC2CC1C1CCC(COC(=O)C=C)C21] | 180 |
| B5 | 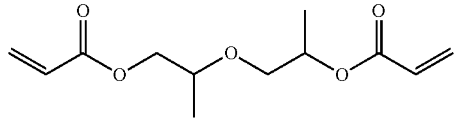 [SMILES: C=CC(=O)OCC(C)OCC(C)OC(=O)C=C] | 104 |
| B6 | 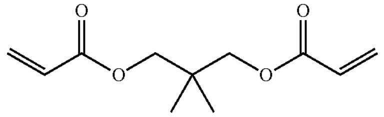 | 107 |
| B7 | 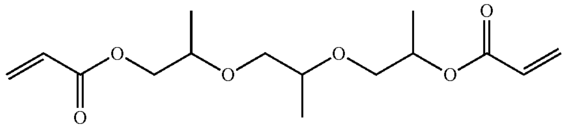 [SMILES: C=CC(=O)OCC(C)OCC(C)OCC(C)OC(=O)C=C] | 62 |

Coating Composition

Example 1: Effect of Functionality of the Reactive Acceptor on the Hardness of the Coating The components for Part A were mixed in the amounts shown in Table 3 below to form Part A, and then Part A and Part B were mixed in the amounts shown in Table 3 below to form a coating composition suitable for forming a Michael addition curing coating.

The resulting coating composition was applied on the test substrate with a wet coating thickness of 100 micrometers or 200 micrometers, respectively, and cured at room temperature. The cured coating was tested with a pendulum hardness tester of BYK-Gardner GmbH according to ASTM D-4366 for its pendulum hardness. The resulting pendulum hardness was expressed in counts. VOC of the each cured coating was measured according to the GB/T23985-2009 by difference, and the results were shown in FIG. 1.

It was shown in FIG. 1 that, compared to reactive acceptors containing more than two carbon-carbon double bond groups, for example, reactive acceptors containing three carbon-carbon double bond groups or four carbon-carbon double bond groups, the reactive acceptor containing two carbon-carbon double bond groups was more beneficial to increase the hardness of the cured coating in the Michael addition curing system.

| Components of coating compositions 1-12 | | | | | | | | | | | | | |
|---|---|---|---|---|---|---|---|---|---|---|---|---|---|
| | | Composition 1 | Composition 2 | Composition 3 | Composition 4 | Composition 5 | Composition 6 | Composition 7 | Composition 8 | Composition 9 | Composition 10 | Composition 11 | Composition 12 |
| Part A | | | | | | | | | | | | | |
| Reactive donor | A1(g) | 69.3 | — | — | 66.8 | — | — | 69.7 | — | — | 62.3 | — | — |
| | A2(g) | — | 68.0 | — | — | 65.3 | — | — | 68.0 | — | — | 60.6 | — |
| | A3(g) | — | — | 67.2 | — | — | 64.6 | — | — | 67.6 | — | — | 59.8 |
| Reactive acceptor | B1(g) | 18.2 | 20.0 | 20.3 | — | — | — | — | — | — | — | — | — |
| | B2(g) | — | — | — | 20.7 | 22.7 | 23.0 | — | — | — | — | — | — |
| | B3(g) | — | — | — | — | — | — | 17.8 | 19.5 | 20.0 | — | — | — |
| | B4(g) | — | — | — | — | — | — | — | — | — | 25.2 | 27.4 | 27.7 |
| Butyl acetate/g | | 4.5 | 4.5 | 4.5 | 4.5 | 4.5 | 4.5 | 4.5 | 4.5 | 4.5 | 4.5 | 4.5 | 4.5 |
| i-propanol/g | | 1.0 | 1.0 | 1.0 | 1.0 | 1.0 | 1.0 | 1.0 | 1.0 | 1.0 | 1.0 | 1.0 | 1.0 |
| 1,2,4-triazole solution (10 wt % in acetone)/g | | 5.43 | 5.43 | 5.43 | 5.43 | 5.43 | 5.43 | 5.43 | 5.43 | 5.43 | 5.43 | 5.43 | 5.43 |
| Part B | | | | | | | | | | | | | |
| Acure 500/g | | 4.24 | 4.24 | 4.24 | 4.24 | 4.24 | 4.24 | 4.24 | 4.24 | 4.24 | 4.24 | 4.24 | 4.24 |

Figure 2:
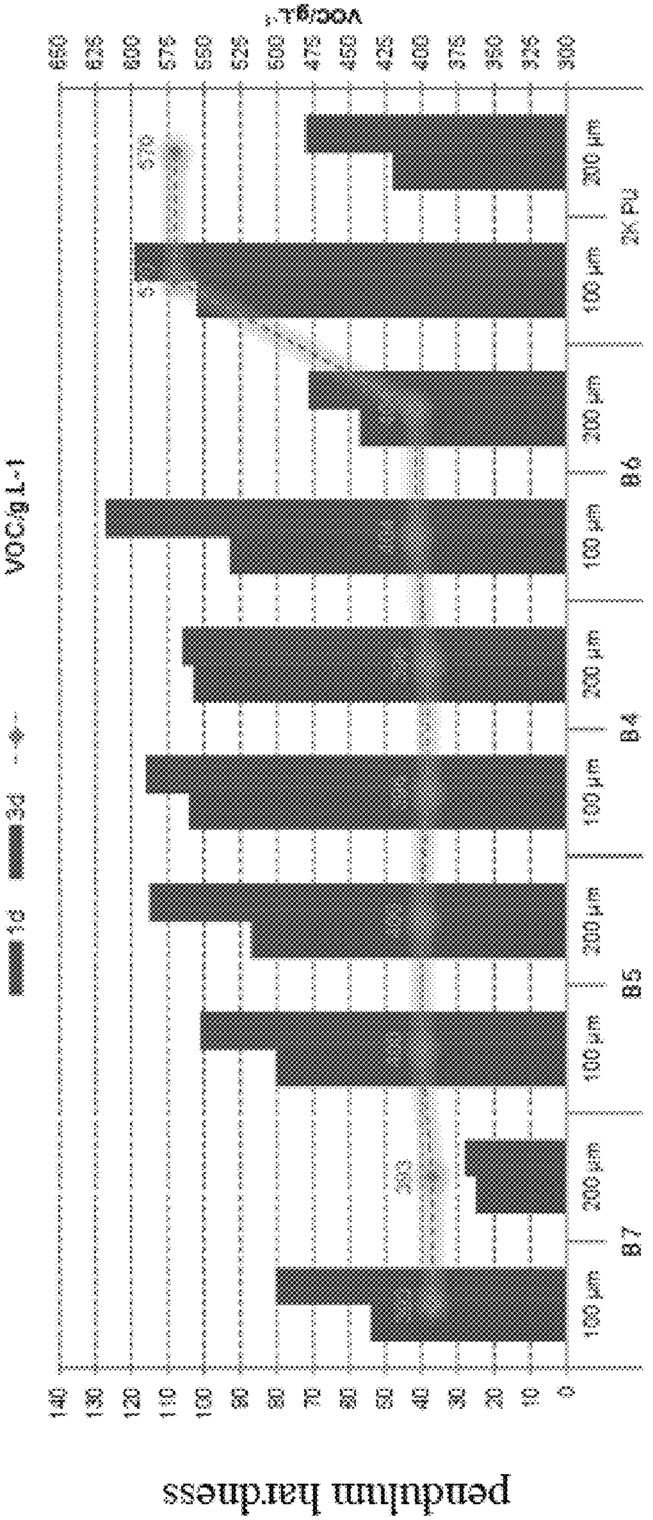
FIG. 2 shows the hardness and VOC results of the cured coatings formed by Michael addition curing varnishes containing various bi-functional reactive acceptors with different Tg and conventional two-component polyurethane paints, where the coating thickness is 100 microns or 200 microns. The bi-functional reactive acceptors comprise a bi-functional reactive acceptor B7 with a Tg of 62° C., a bi-functional reactive acceptor B5 with a Tg of 104° C., a bi-functional reactive acceptor B4 with a Tg of 180° C., and a bi-functional reactive acceptor B6 with a Tg of 107° C., respectively.

Note:
cured at temperature of the each cured coating was measured according to the GB/T23985-2009 by difference, and the results were shown in FIG. 2.

Example 2: Effect of Glass Transition Temperature of the Reactive Acceptor on the Hardness of the Coating The components for Part A were mixed in the amounts shown in Table 4 below to form Part A, and then Part A and Part B were mixed in the amounts shown in Table 4 below to form a coating composition suitable for forming a Michael addition curing coating.

TABLE 4

| Components of coating compositions 13-16 | | | | | |
|---|---|---|---|---|---|
| | | Composition 13 | Composition 14 | Composition 15 | Composition 16 |
| Part A | | | | | |
| Reactive Donor | A3(g) | 59.9 | 63.8 | 59.7 | 66.0 |
| Reactor Acceptor | B7(g) | 27.6 | — | — | — |
| | B5(g) | — | 23.7 | — | — |
| | B4(g) | — | — | 27.9 | — |
| | B6(g) | — | — | — | 21.5 |
| Butyl acetate/g | | 4.50 | 4.50 | 4.50 | 4.50 |
| i-propanol/g | | 1.0 | 1.0 | 1.0 | 1.0 |
| 1,2,4-triazole solution (10 wt % in acetone)/g | | 5.43 | 5.43 | 5.43 | 5.43 |
| Part B | | | | | |
| Acure 500 | | 4.24 | 4.24 | 4.24 | 4.24 |

Note:
cured at temperature

The resulting coating compositions 13-16 were applied on the test substrate with a wet coating thickness of 100 micrometers or 200 micrometers, respectively, and cured at room temperature. The cured coatings were tested with a pendulum hardness tester of BYK-Gardner GmbH according to ASTM D-4366 for their pendulum hardness. The resulting pendulum hardness was expressed in counts. VOC It was shown in FIG. 2 that glass transition temperature of the reactive acceptor is also an important parameter that affects the hardness of the cured coating. The bi-functional reactive acceptor with a glass transition temperature of 100° C. or higher had significantly better coating hardness than the bi-functional reactive acceptor with a lower glass transition temperature. Moreover, compared with the traditional two-component polyurethane coating composition, a coating composition formulated with a bi-functional reactive acceptor with a glass transition temperature of 100° C. or higher formed a cured coating with equivalent hardness while having obvious lower VOC emissions.

While the invention has been described with respect to a number of embodiments and examples, those skilled in the art, having benefit of this invention, will appreciate that other embodiments can be devised which do not depart from the scope and spirit of the invention as disclosed herein.

What is claimed is:

1. A coating composition for wood substrate comprising:

(A) a film-forming resin composition comprising a reactive donor capable of providing two or more nucleophilic carbanions, and a reactive acceptor comprising two carbon-carbon double bonds;

(B) a catalyst for catalyzing a Michael addition crosslinking reaction between the reactive donor and the reactive acceptor, wherein at least one of the reactive acceptor and the reactive donor comprises an aromatic ring structure, and wherein the polymer formed by homopolymerization of the reactive acceptor has a Tg of 100° C. or higher.

2. The coating composition according to claim 1, wherein the reactive acceptor has a molar mass of 1000 g/mol or less.

3. The coating composition of claim 1, wherein the carbon-carbon double bond has the structure of Formula I below:

C=C—CX (Formula I)

wherein CX represents any one of an aldehyde group (—CHO), a keto group (—CO—), an ester group (—C(O)O—), and a cyano group (—CN).

4. The coating composition according to claim 1, wherein the reactive acceptor is one or more selected from the group consisting of α,β-unsaturated carboxylic acid esters of the formula:

(Formula A)

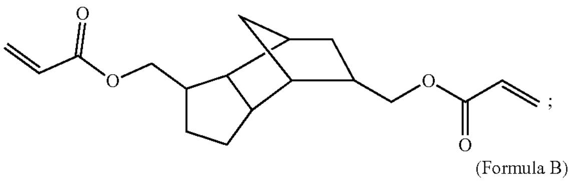
;

(Formula B)

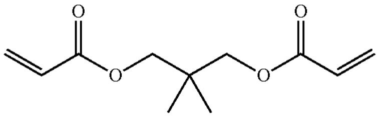
; and (Formula C)

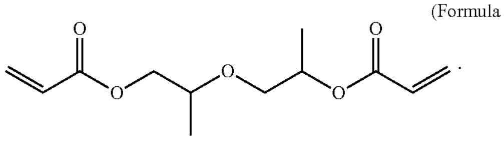
.

5. The coating composition of claim 1, wherein the reactive donor comprises two or more acidic protons C—H in an activated methylene or methine group.

6. The coating composition according to claim 1, wherein the reactive donor is obtained by reacting an acetoacetate or a malonate compound with an aromatic compound.

7. The coating composition according to claim 6, wherein the aromatic compound is an aromatic epoxy resin and/or an aromatic polyester.

8. The coating composition according to claim 7, wherein the aromatic compound is an aromatic epoxy resin and the reactive donor has an epoxy equivalent weight in the range of from 400 to 2300 g/mol.

9. The coating composition of claim 1, which further comprises one or more solvents, and the solvent is one or more selected from the group consisting of isopropanol, ethyl acetate and butyl acetate.

10. The coating composition of claim 1, having a VOC content of 420 g/L or less.

11. The coating composition of claim 1, wherein the coating composition is applied at a wet coating thickness of 100 microns and dried for one day, the resulting cured coating exhibits a pendulum hardness of 70 or greater.

12. The coating composition of claim 1, wherein the coating composition is applied at a wet coating thickness of 200 microns and dried for one day, the resulting cured coating exhibits a pendulum hardness of 50 or greater.

13. A wood article comprising a wood substrate having at least one major surface; and a cured coating formed from the coating composition of claim 1 that is directly or indirectly applied on the major surface.

14. The wood article according to claim 13, wherein the wood substrate is selected from one or more of hardwood, chestnut, eucalyptus, red chestnut, camellia, Douglas fir, Japanese cedar, American cypress, Japanese red pine, Japanese cypress, water walnut, black walnut, maple, Japan beech, Japanese paulownia, birch, Borneo, magnolia, ash, teak, *Xylosma japonicum*, Catalpa wood, *Dryobalanops* spp., fir, oak and rubber wood.

* * * * *